United States Patent
Stewart et al.

[19]

[11] Patent Number: 6,009,091
[45] Date of Patent: Dec. 28, 1999

[54] METHOD AND APPARATUS FOR MOBILE STATION LOCATION WITHIN A COMMUNICATION SYSTEM

[75] Inventors: Kenneth A. Stewart, Rolling Meadows; Amitava Ghosh, Vernon Hills, both of Ill.

[73] Assignee: Motorola, Inc., Schaumburg, Ill.

[21] Appl. No.: 09/041,898

[22] Filed: Mar. 13, 1998

[51] Int. Cl.$^6$ .................................................... H04J 13/02
[52] U.S. Cl. ......................................... 370/342; 455/456
[58] Field of Search .................................... 370/324, 335, 370/252, 320, 342, 441, 479; 375/200, 201, 202, 203, 204, 205; 342/457; 455/456, 457, 67.1

[56] References Cited

U.S. PATENT DOCUMENTS

| | | | |
|---|---|---|---|
| 5,508,708 | 4/1996 | Ghosh et al. | 342/457 |
| 5,548,583 | 8/1996 | Bustamante | 370/335 |
| 5,736,964 | 4/1998 | Ghosh et al. | 375/200 |
| 5,878,034 | 3/1999 | Hershey et al. | 370/324 |

OTHER PUBLICATIONS

"Location Power Up Function," TR45.5.2.3/97.07.17.02 by A. Ghosh, G. Bruckert, B. Verbiscer and M. Panjwani and in ETSI SMG2 document UMTS A36/97 and USPT#5,508, 708 dated Apr. 16, 1996 by Ghosh et. al.

"Tree Structured Generation of Orthogonal Spreading Codes with different lengths for Forward Link of DS–CDMA Mobile Radio," Electronics Letters, Jan. 2, 1997, pp. 27–28, by F. Adachi, M. Sawahashi, and K. Okawa.

"Concept Group Alpha—Direct–Sequence CDMA (WCDMA)" Evaluation Document (3.0), Part 1,Dec.15–19, 1997.

*Primary Examiner*—Huy D. Vu
*Attorney, Agent, or Firm*—Kenneth A. Haas

[57] ABSTRACT

A Dedicated Physical Location Channel (DPLCH) is utilized by a mobile station (913) to support subscriber location functions. The DPLCH is spread by an Orthogonal Variable Spreading Factor (OVSF) code $C_L$ (502) of length 256 which is distinct from those OVSF codes assigned to other channels utilized by the mobile station (913). When a power-up function (PUF) is received by the mobile station (913), the DPLCH sub-channel amplitude is then modified relative to the other channels being utilized by the mobile station (913) using gain module $G_L$ (503) prior to combination (504) with the other channels.

17 Claims, 11 Drawing Sheets

MS SPREADING APPARATUS INCORPORATING LOCATION SUBCHANNEL (DPLCH)

MS SPREADING APPARATUS INCORPORATING LOCATION SUBCHANNEL (DPLCH)

UPLINK TIME SLOT STRUCTURE INCORPORATING
DPLCH AND MODULATING SEQUENCE

METHOD AND APPARATUS FOR MOBILE STATION LOCATION WITHIN A COMMUNICATION SYSTEM

FIELD OF THE INVENTION

The present invention relates generally to a physical layer sub-channel in an asynchronous Code Division Multiple Access (CDMA) cellular communications system, and in particular to a method and apparatus for mobile station location utilizing such a physical layer sub-channel.

BACKGROUND OF THE INVENTION

FIG. 1 and FIG. 2 show an exemplary configuration of the spreading, modulation, and framing design for the uplink (i.e. the mobile station (MS) to base station (BS) link) of a so-called "$3^{rd}$ Generation" (3G) cellular communications system based on Code Division Multiple Access (CDMA) principles. That system is generally described in the European Telecommunications Standards Institute (ETSI) report of sub-group SMG2, entitled "Concept Group Alpha—Direct-Sequence CDMA (WCDMA) Evaluation Document (3.0), Part1, Dec. 15–19, 1997." There are two types of physical sub-channels shown in FIG. 1, namely the Dedicated Physical Data Channel (DPDCH) 101 and the Dedicated Physical Control Channel (DPCCH) 102. The DPDCH is used to carry dedicated data generated at layer 2 and above while the DPCCH is used to carry control information generated at layer 1.

As shown in FIG. 2, the DPDCH and DPCCH are separated into 10 ms frames 201, and further separated into 625 us timeslots 202. The DPDCH carries $10*2^K$ BPSK symbols (i.e. bits) in each timeslot, where K is an integer in the range 0–6. In the example illustrated by FIG. 2, K=1, allowing 20 data bits 206 (symbols d(0)–d(19)) to be transmitted per timeslot giving a bit rate of 32 kbps. Since the spreading rate is 4.096 Mega-chips per second in the example shown, there are 2560 ($N_P$) chips in each timeslot, with each DPDCH data symbol being spread by a factor of 128.

The DPCCH consists of a) known pilot symbols 203 to support channel and received signal-to-noise (SNR) estimation at the BS rake receiver, b) a Transmit Power Control Indicator (TPCI) field 204 to support closed-loop BS transmit power control, and c) a Rate Indicator (RI) field 205 used to describe the information rate of each 10 ms frame. The DPCCH is typically spread by a factor of 256.

The DPDCH and DPCCH are respectively mapped to the in-phase (I) and quadrature (Q) branches of the MS transmitted waveform. The resulting I and Q signal is then spread to the chip rate using two different orthogonal channelization codes $C_D$ 103 and $C_C$ 104. The channelization codes are Orthogonal Variable Spreading Factor (OVSF) codes selected from the hierarchy of such codes described in detail in "Tree Structured Generation of Orthogonal Spreading Codes with different lengths for Forward Link of DS-CDMA Mobile Radio," Electronics Letters, Jan. 2nd, 1997, pp.27–28, by F. Adachi, M. Sawahashi, and K. Okawa. Since, in the example shown, it is assumed that the desired coded bit rate of the DPCCH is 32 kbps, the DPDCH channelization code $C_D$ is required to be length 128. The DPCCH channelization code is likewise an allowable OVSF code of length 256, regardless of the bit rate of the DPDCH.

The complex-valued signal 111 resulting from the combination of DPCCH and DPDCH is then scrambled by an MS-specific primary scrambling code $C_S$ 105. In the prior art, this primary scrambling code is complex-valued, is of length-256, and is constructed using a pair of extended Very Large Kasami codes although any code family with good auto- and cross-correlation properties may be used. The resulting spread signal is then filtered using square-root raised-cosine chip pulse-shaping filters 108 and 109 before being quadrature modulated 109 and transmitted from antenna 110.

Radio trilateration techniques have been widely used in many mobile transmitter location systems (e.g., Loran-C). There are two primary methods to achieve trilateration, namely the a) Time of Arrival (TOA) and b) Time Difference of Arrival (TDOA) methods. TDOA requires each BS to estimate, with respect to a local timing reference, the time delay of the MS signal using a time delay estimator. FIG. 3 shows the block diagram of a prior-art BS time delay estimator that may be used to form such an estimate given the transmitted MS signal described above. In FIG. 3, the received signal is first converted to baseband using quadrature demodulator 301, then processed using chip pulse matched filter 302, and sampled using analog-digital (ADC) 303. The signal is then passed through Code Matched Filter (CMF) 304, where the taps of the filter are set equal to the length-$N_{PILOT}$ code C* 207 shown in FIG. 2, where C* 207 is constructed by concatenating K copies of the length-256 code formed as the product of the $C_C$ and $C_S$ codes, and where $N_{PILOT}$=256K. In the example of FIG. 3, K=5.

A time delay estimate is then formed by coherently accumulating 305 the complex-valued CMF outputs to an array of $N_P$ observations or "ranging bins" (where $N_P$ is 2560 as shown in FIG. 2) for N timeslots, and then non-coherently accumulating 312 the result for M such length-N timeslot periods. The total observation time is therefore N×M timeslots. The length-$N_P$ real-valued output array of the non-coherent accumulator 312, i.e., the array of available decision statistics 307, is then passed through a Time Delay Decision Algorithm 308 which gives the time delay estimate to 309 of the MS signal with respect to the local timing reference, where the Time Delay Decision Algorithm 308 may be as simple as selecting the ranging bin with largest magnitude decision statistic 307. This time delay estimate 309 can then be combined with time-delay estimates from other BSs and used in the derivation of MS location using, for example, the TDOA technique.

The ability to use such trilateration techniques in a DS-CDMA system utilizing MS transmit power control is, however, problematic since MSs close to BSs (i.e. a "proximal" BS) transmit at low output power in order to avoid the well-known near-far problem for CDMA systems. Since such MSs are observed at very low SNR at distant BSs, it may not be possible in such cases to form a reliable time-delay estimate at distant BSs. One of the ways to increase the visibility of the MS to multiple BSs is to increase the MS power level for a brief period at a pre-defined time period using a so-called Power-Up Function (PUF) command from the infrastructure equipment. Details of PUF can be found in Telecommunications Industry Association (TIA) contribution "Location Power Up Function," TR45.5.2.3/97.07.17.02 by A. Ghosh, G. Bruckert, B. Verbiscer and M. Panjwani and in ETSI SMG2 document UMTS A36/97 and U.S. Pat. No. 5,508,708 dated Apr. 16, 1996 by Ghosh et. al.

PUF can be used for performing MS location in systems employing the prior-art MS transmitter/transmission structure described above. In this case, the pilot field of the DPCCH (see FIG. 1 and FIG. 2) is sent at higher power for the duration of the PUF. The TDOA information required for MS location can then be derived from observation of the pilot field at multiple distant base stations using trilateration methods and a code matched filter (CMF) matched only to the pilot field of the DPCCH. (If the entire DPCCH transmission over the timeslot were used, range estimation would have to be performed jointly with determination of modulated TPCI 204 and RI 205 symbols). In practice, however, the CMF would not be matched to the entire DPCCH and would not be of length-2560, but rather of length $N_{PILOT}$. This leads to reduction in SNR at distant BS filter outputs. Also, it is inefficient to transmit the TPCI 204 and RI 205 fields at higher power during PUF, since those fields are not used at the CMF. Transmitting only the pilot field 203 at higher power, however, would lead to undesirable MS transmit power envelope variations. Furthermore PUF probe cancellation at proximal BSs becomes cumbersome with this approach.

Thus a need exists for a method and apparatus for location of a mobile station within a communication system that results in a higher SNR at distant BSs without the undesirable MS transmit power envelope variations and other disadvantages of prior-art location techniques.

DETAILED DESCRIPTION OF THE DRAWINGS

Figure 1:
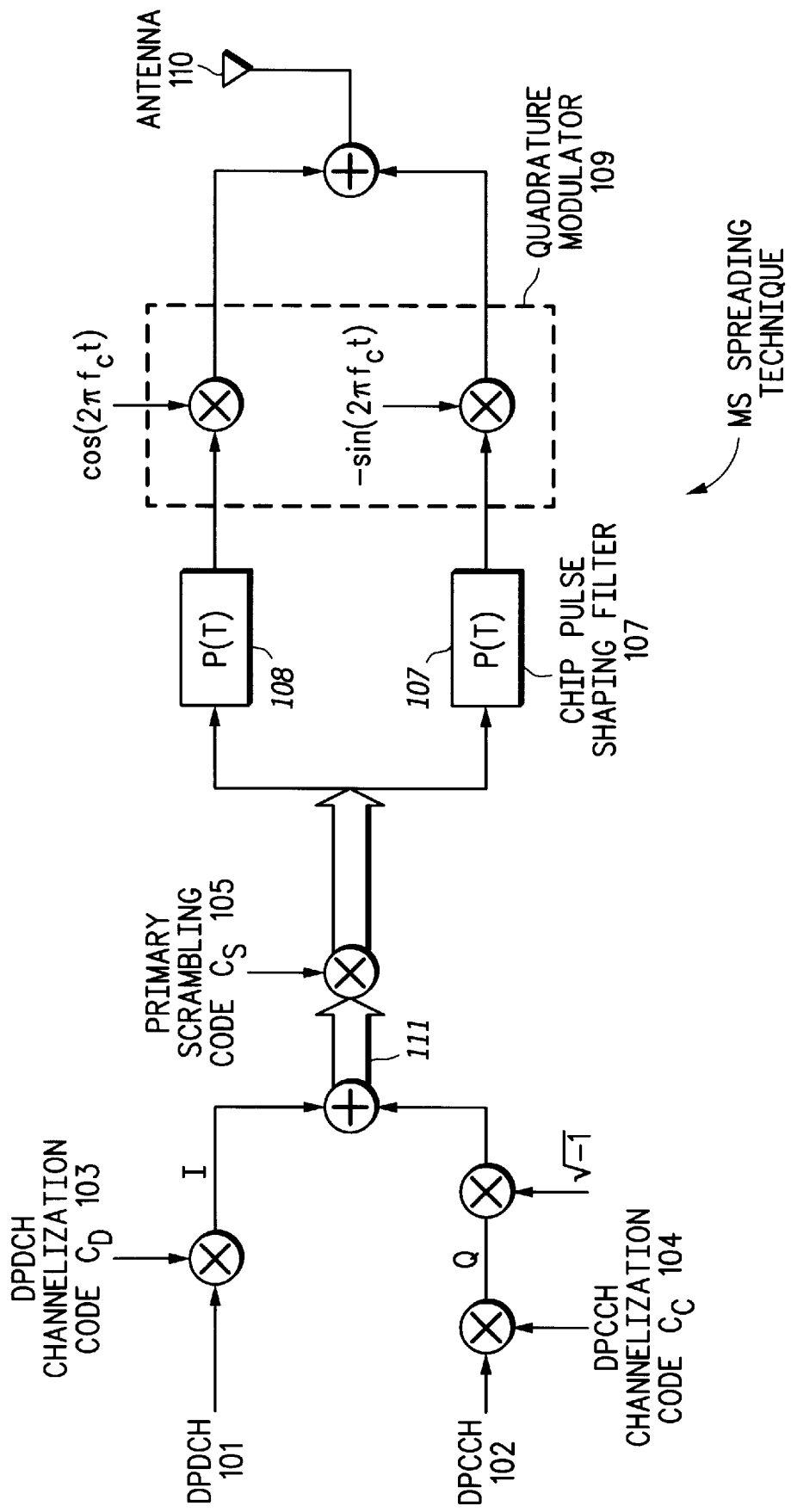
FIG. 1 is a block diagram of a prior-art mobile station spreading technique for a Wideband CDMA system.
Figure 2:
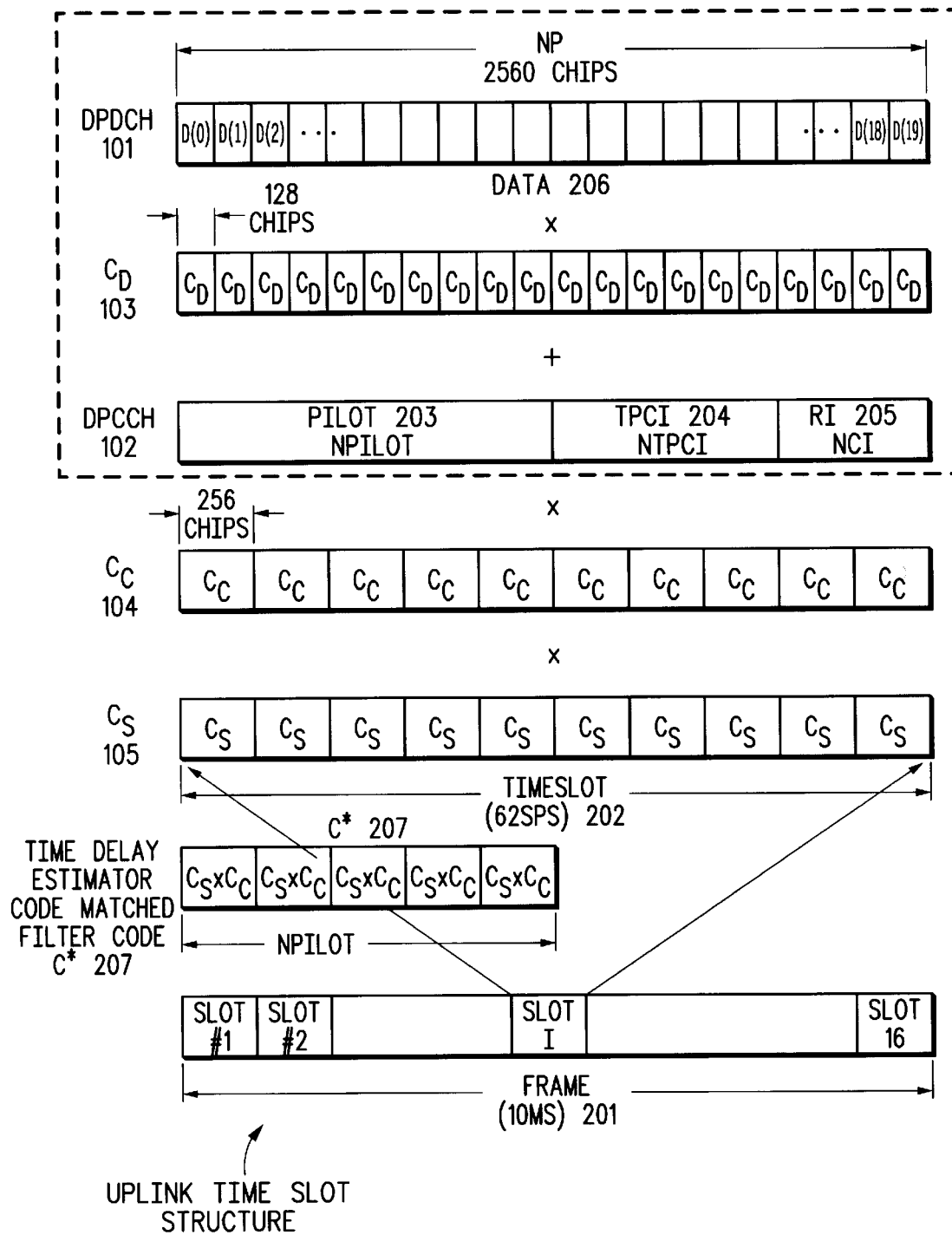
FIG. 2 shows a prior-art uplink timeslot structure for a Wideband CDMA System.
Figure 3:
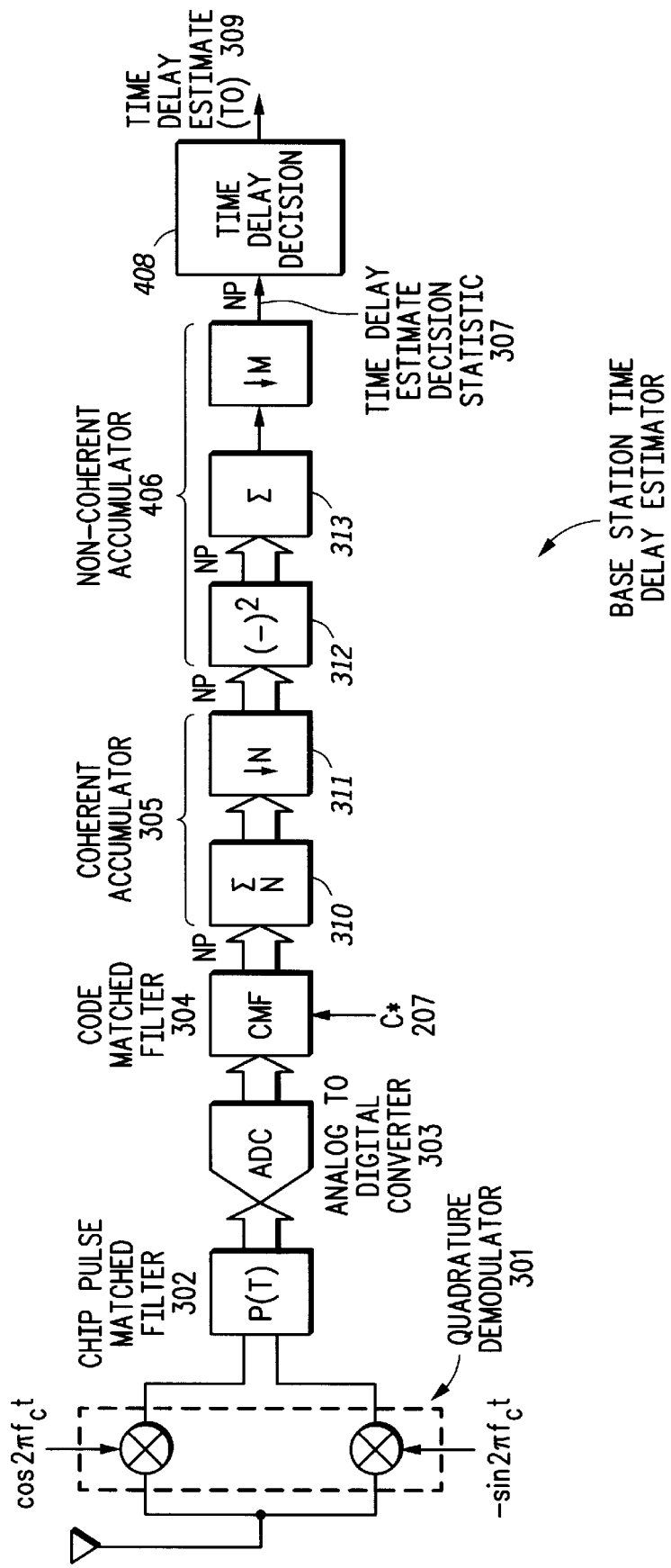
FIG. 3 is a block diagram of a prior-art base station time delay estimator.

To overcome the problems described above a Dedicated Physical Location Channel (DPLCH) is utilized by each mobile station to support subscriber location functions. The DPLCH is spread by an Orthogonal Variable Spreading Factor (OVSF) code $C_L$ of length 256 which is distinct from those OVSF codes assigned to other channels utilized by the mobile station. When a power-up function (PUF) is received by the mobile station, the DPLCH sub-channel amplitude is then modified (relative to the other channels being utilized by the mobile station) using a gain module prior to combination with the other channels.

The present invention encompasses a method for mobile station location within a communication system. The method comprises the steps of communicating with a plurality of base stations via a first frequency band using a first spreading code, communicating with the plurality of base stations via the first frequency band using a second spreading code, and communicating with the plurality of base stations via the first frequency band using a third spreading code, the third spreading code defining a third channel utilized for transmitting information to the plurality of base stations that is utilized for mobile station location within the communication system.

The present invention additionally encompasses a method for mobile station location within a communication system. The method comprises the steps of communicating with a plurality of base stations via a first frequency band using a first spreading code, (where the first spreading code defines a first channel utilized for transmitting data from the mobile station to the plurality of base stations), communicating with the plurality of base stations via the first frequency band using a second spreading code (where the second spreading code defines a second channel utilized for transmitting control information from the mobile station to the plurality of base stations), and communicating with the plurality of base stations via the first frequency band using a third spreading code (where the third spreading code defines a third channel utilized for transmitting information to the plurality of base stations that is utilized for mobile station location within the communication system). When a power-up function command is received, the power of only the third channel is adjusted in response to the received power-up function command.

The present invention further encompasses a method for mobile station location within a communication system. The method comprises the steps of receiving, via a first frequency band, a first spreading code, receiving, via the first frequency band, a second spreading code, and receiving, via the first frequency band, a third spreading code. Next, a power-up function command is transmitted and in response, the third spreading code is received at an increased power and the first and second spreading codes are received at substantially the same power level. In the preferred embodiment of the present invention, the third spreading code defines a third channel utilized for transmitting information to the base station that is utilized for mobile station location within the communication system.

Finally, the present invention encompasses an apparatus for locating a mobile station within a communication system. The apparatus comprises circuitry for receiving data spread via a spreading code and transmitted by the mobile station. In the preferred embodiment, the spreading code defines a channel utilized for transmitting information to the base station that is utilized for mobile station location within the communication system and a propagation delay calculator for calculating the propagation delay of the data received.

Prior to describing the DPLCH, the following descriptions of TOA and TDOA methods for location are provided to set the necessary background for utilization of the preferred embodiment of the present invention.

TOA Method for Location: When the distances $\rho_1$ and $\rho_2$ between a MS and a pair of fixed BSs are known, the position of the MS may be computed by determining the point of intersection of two circles with radii $\rho_1$ and $\rho_2$, each centered at one of the fixed BSs. If an error exists in either or both distance determinations, the true position of the MS, P, will be displaced and observed to lie at the intersection P', of the perturbed radial arcs $\rho_{11}$, and $\rho_{12}$. A third BS is typically needed to unambiguously locate each MS at the unique point of intersection of the three circles. To accurately compute the MS location using this method, it is necessary to know precisely the instant the signal is emitted from the BSs and the instant it arrives at the MS. For this method to work properly, an accurate measurement of the total time delay along each of three MS to BS signal paths is necessary.

Figure 4:
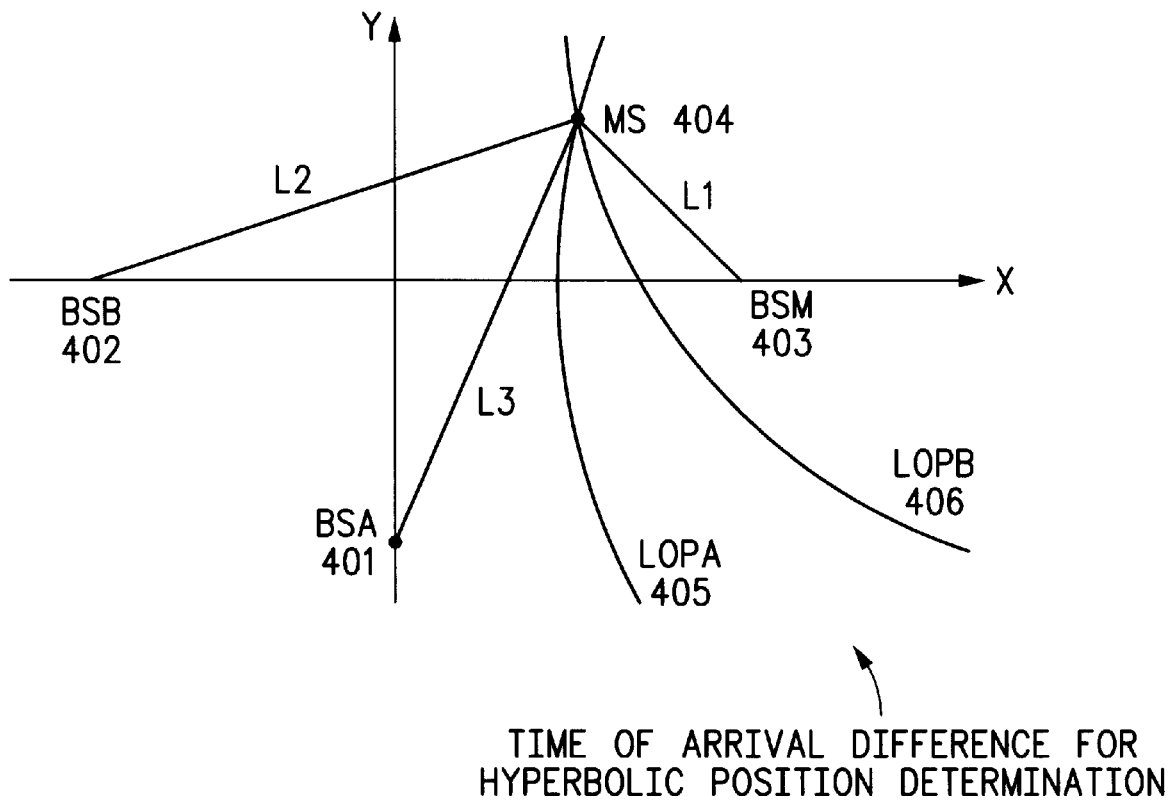
FIG. 4 illustrates the Time Difference of Arrival (TDOA) method for hyperbolic position determination in accordance with the preferred embodiment of the present invention.

TDOA Method for Location: For this method of location, the observed time difference between pairs of signals arriving at the MS from three or more BSs are used to compute the location of the MS. This method, in its simplest form, is illustrated in FIG. 4. Here, three BSs are shown as BS A 401, BS B 402, and BS M 403. The MS 404, by observing the time difference in arriving signals between BS pairs A-M and B-M, can establish the hyperbolae or "lines of position" (LOPs') indicated respectively as LOPA 405 and LOPB 406. In this method therefore, the location estimate can be obtained without knowledge of the absolute arrival time of the signal from each BS at the MS, only time differences in arrival are significant.

The TDOA method can applied equally successfully when, rather than forming the location estimate at the MS by observing arrival time differences between signals transmitted from distant BSs, the location estimate is determined by instead estimating the time difference between BS observations of a signal transmitted by the MS. This approach is useful in so-called "asynchronous" CDMA cellular communication systems, in which the signals transmitted by each BS are not synchronized to a central timing reference such as the Global Positioning System (GPS). However, the local timing reference between BSs should be known for TDOA to work effectively.

Figure 5:
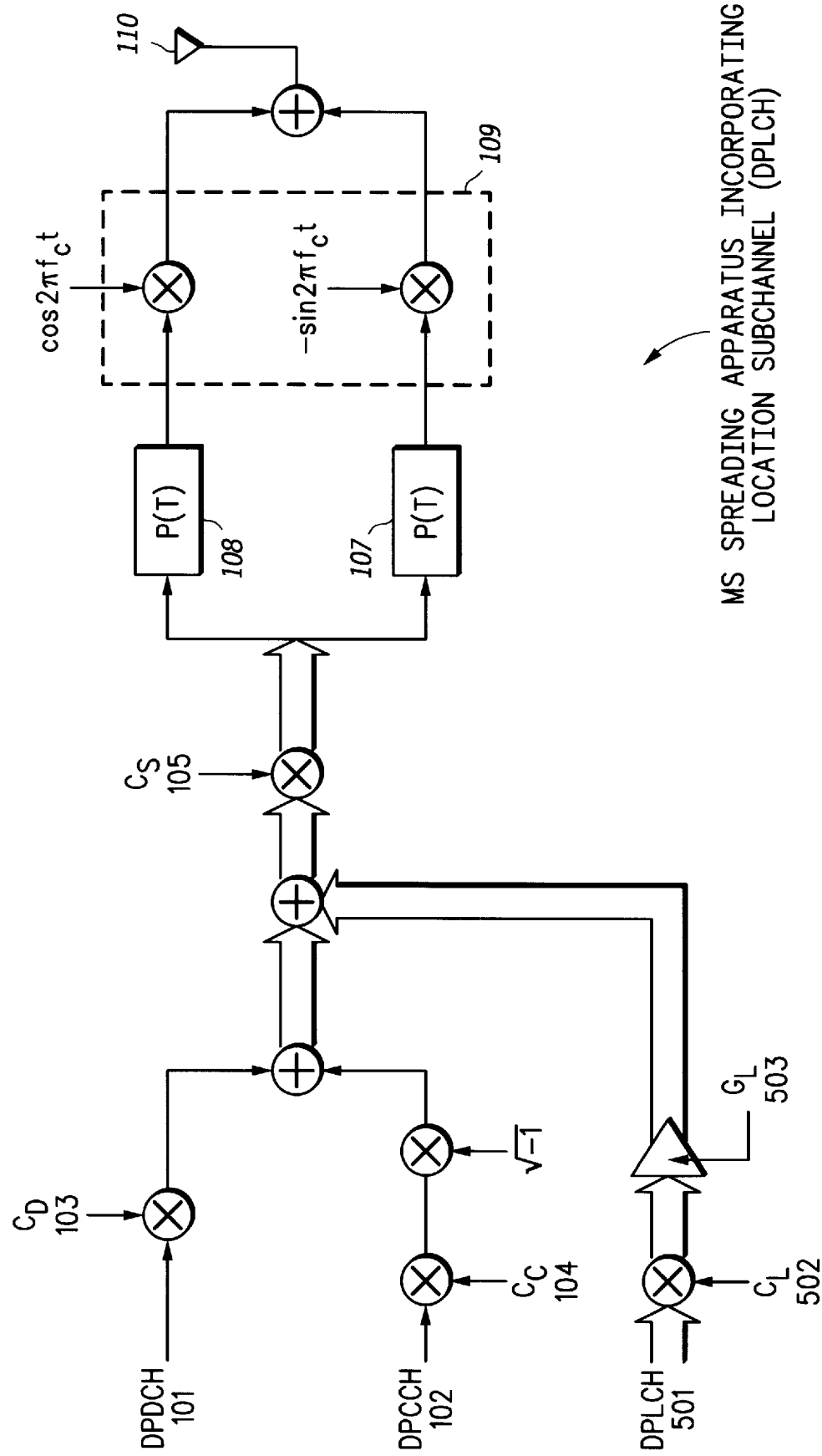
FIG. 5 is a block diagram of the mobile station spreading technique for a Wideband CDMA system incorporating a location sub-channel in accordance with the preferred embodiment of the present invention.

A MS spreading structure incorporating DPLCH in accordance with the preferred embodiment of the present invention is shown in FIG. 5. Here, the DPLCH symbol 501 is spread by an orthogonal OVSF code $C_L$ 502 of length 256 which is distinct from those OVSF codes $C_D$ and $C_C$ assigned respectively to other channels utilized by the MS, (i.e., the DPDCH or DPCCH sub-channels). The DPLCH sub-channel amplitude is then modified relative to the DPDCH and DPCCH sub-channels using gain module $G_L$ 503 prior to combination 504 with the DPDCH and DPCCH sub-channels. Scrambling is accomplished using the primary scrambling code $C_S$ 105 before pulse shaping 107, 108, quadrature modulation 109, and transmission 110.

Although FIG. 5 shows the code $C_L$ 502 used to spread the DPLCH to be a length-256 OVSF code, it may be any OVSF code which, according to the known properties of OVSF codes described above, is orthogonal to the DPCCH and any (possibly multiple) DPDCH codes already assigned. Also, code $C_L$ 502 may be a code built permanently into the MS (i.e. defined at time of manufacture) or may be assigned as part of a network signaling protocol executed before or during location estimation.

The data symbol underlying the DPLCH spreading process is generally complex-valued, and in the preferred embodiment, is selected in such a way as to minimize amplitude variations in the MS complex-valued transmitted signal envelope. In the example of FIG. 5, the DPLCH symbol is assumed to be unity. A gain module $G_L$ 503 is used to set the transmitted DPLCH sub-channel power to a level consistent with reliable time-delay estimation at multiple distant BSs. The DPLCH sub-channel is transmitted continuously for a specific number of timeslots or frames established either a) at time of manufacture, or b) as part of a network signaling protocol executed before or during location estimation.

Figure 6:
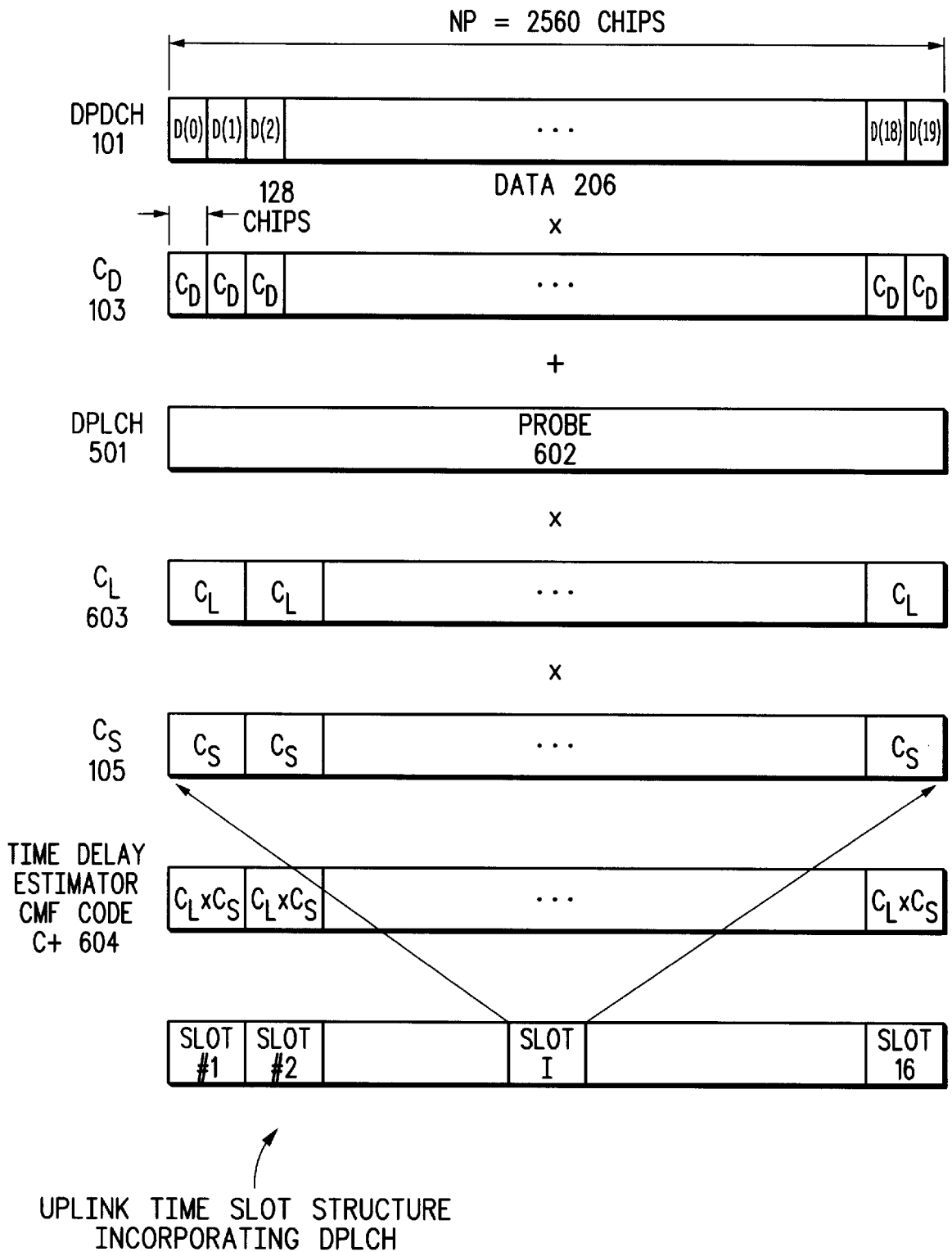
FIG. 6 shows the uplink timeslot structure for a Wideband CDMA system incorporating the sub-channel of FIG. 5 in accordance with the preferred embodiment of the present invention.

As illustrated in FIG. 6, the DPLCH 501 consists of only known probe symbols 602 to support MS location. For simplicity, the DPCCH 102 is omitted from FIG. 6. In FIG. 6, the DPLCH is spread by a factor of 256 by code $C_L$ 603, although as stated above any OVSF code which maintains orthogonality to the code sub-channels present is acceptable.

Figure 7:
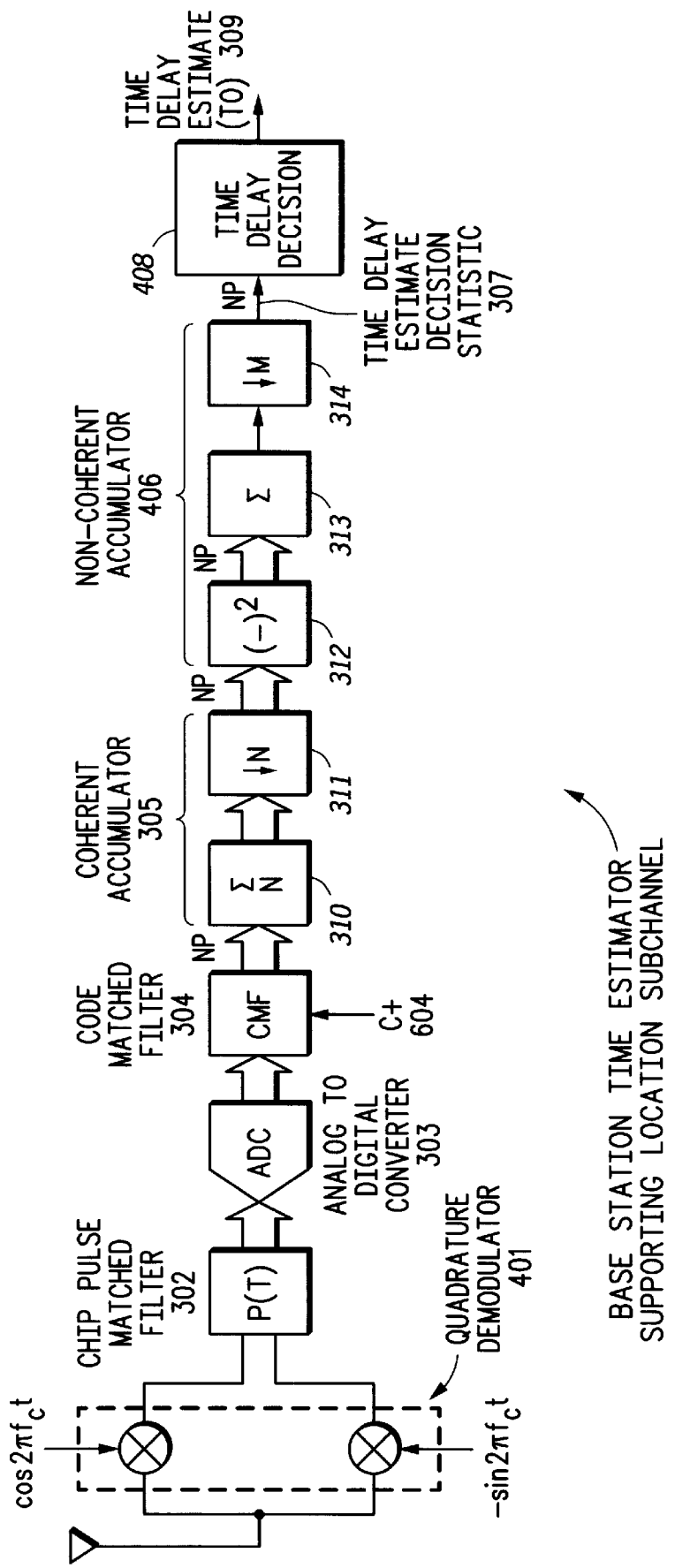
FIG. 7 is a block diagram of the base station time delay estimator supporting location sub-channel in accordance with the preferred embodiment of the present invention

The block diagram of the modified BS time delay estimator supporting the DPLCH location sub-channel is shown in FIG. 7. The signal from the ADC is passed through Code Matched Filter (CMF) 404, where the taps of the filter are set equal to the length-$N_P$ code $C^+$ 604 shown in FIG. 6, where $C^+$ 604 is formed as the product of the $C_L$ and $C_S$ codes. In the preferred embodiment of the present invention, the CMF is of length-$N_P$ (i.e., 2560 chips) rather than $N_{PILOT}$. Accordingly, a simple $N_P$-ary CMF may be implemented at the BS with corresponding improvement in CMF output SNR of $2560/N_{PILOT}$ compared with prior-art estimators.

The invention described here also provides other advantages. First, since the transmitted power level of the DPCCH is unaffected during PUF operation, operation of reverse-link power control loop at proximal BSs (which is typically based on the observed SNR of the pilot field of the DPCCH) is also unaffected by PUF. Secondly, since the DPLCH is un-modulated (recall the DPCCH contains the modulated TPCI and RI fields) DPLCH sub-channel cancellation at proximal BSs is simpler.

Figure 8:
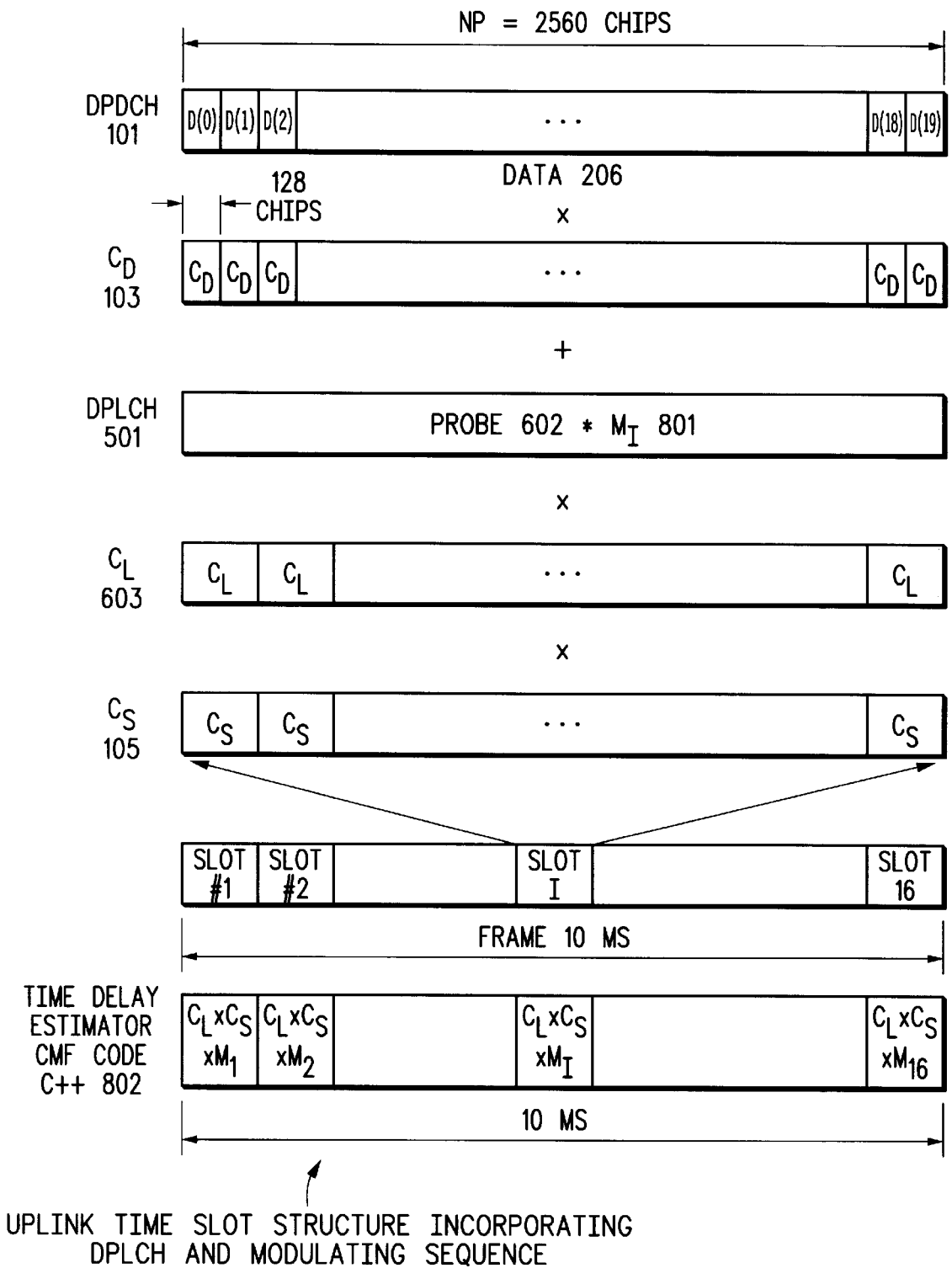
FIG. 8 shows the uplink timeslot structure for a Wideband CDMA system incorporating the sub-channel of FIG. 5 and a modulating sequence in accordance with an alternate embodiment of the present invention.

In the preferred embodiment of the present invention the unambiguous range of a mobile station from any base station calculating the mobile station's location is limited to 256 chips or 62.5 us which, corresponds to 12.5 miles. In an alternate embodiment of the present invention, the range is increased to 2560 chips. In the alternate embodiment of the present invention, the probe sequence corresponding to DPLCH channel is modulated by a complex sequence of length 16 as shown in FIG. 8. The modulating sequence $M_i$ 801 can be chosen from a set of length 16 sequence offering good auto-correlation properties to the sequence C++ 802 where $C^{++}$ 802 is formed as the product of the $C_L$, $C_S$ and the modulating sequence $M_i$. The BS time delay estimator in this case will be similar to FIG. 7 except the taps of the CMF 404 are set equal to the length-$N_P$ code $C^{++}$ 802 shown in FIG. 8.

Figure 9:
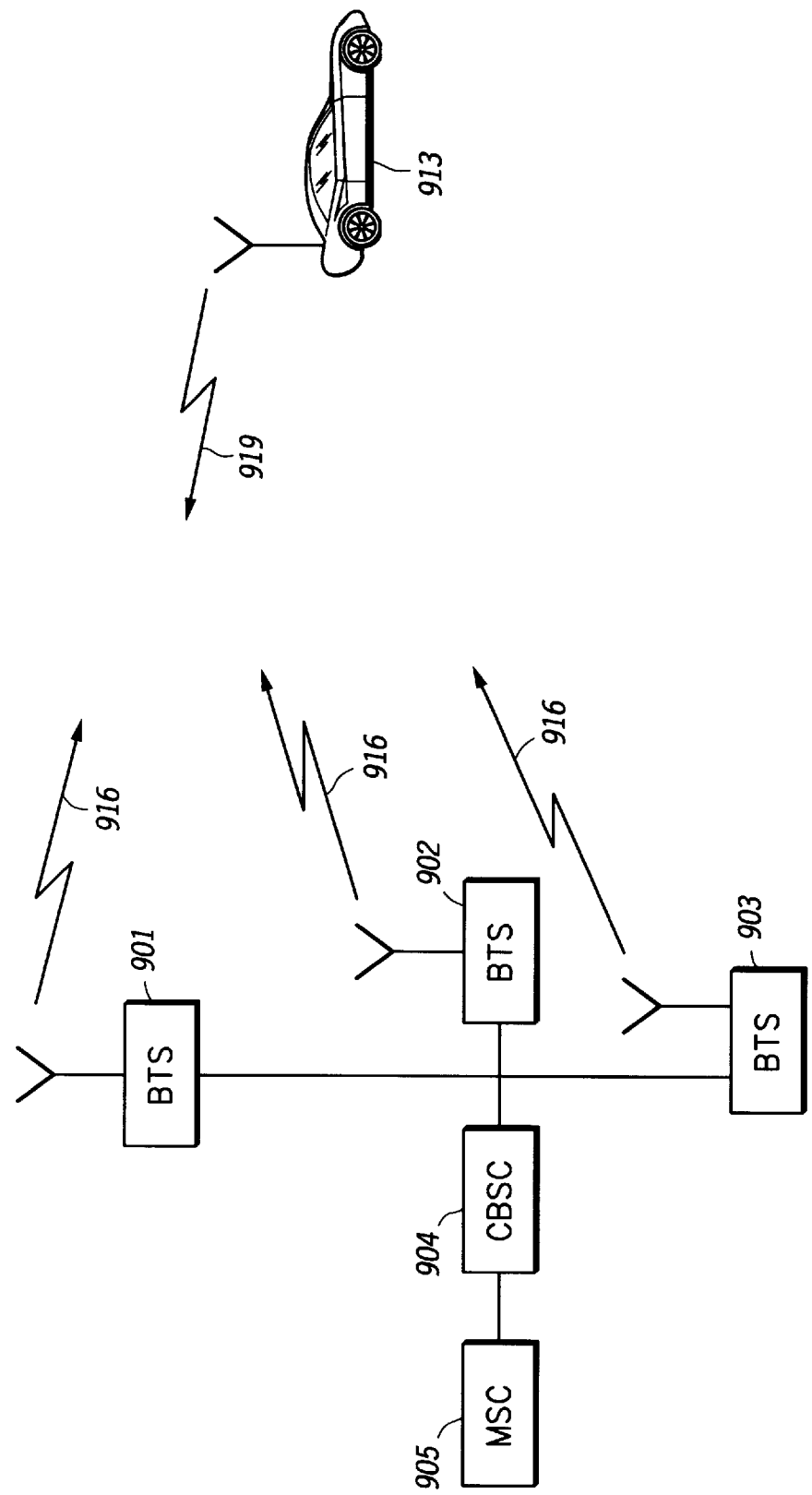
FIG. 9 illustrates a wireless communication system in accordance with the preferred embodiment of the present invention.

FIG. 9 illustrates a wireless communication system 900 in accordance with the preferred embodiment of the present invention. In the preferred embodiment of the present invention, communication system 900 utilizes a Wide-band Code Division Multiple Access system protocol as described above. Communication system 900 includes base station 901, base station 902, base station 903, mobile station 913, Centralized Base Station Controller (CBSC) 904, and Mobile Switching Center (MSC) 905. As shown, mobile station 913 is communicating with base stations 901 902, and 903 via uplink communication signals 919 and base stations 901, 902, and 903 are communicating with mobile station 913 via downlink communication signals 916. In the preferred embodiment of the present invention, base stations 901, 902, and 903 are suitably coupled to CBSC 904, and CBSC is suitably coupled to MSC 905.

Operation of communication system 900 occurs as follows. Mobile station 913 actively communicates with base stations 901–903 by utilizing both the Dedicated Physical Data Channel 101 and the Dedicated Physical Control Channel 102. As discussed above, both channels 101 and 102 are spread utilizing two different orthogonal channelization codes. In the preferred embodiment of the present invention, mobile station 916 broadcasts (periodically or when requested by the source base station during location estimation) a Dedicated Physical Location Channel, that is utilized to support subscriber location functions. As discussed above the Dedicated Physical Location Channel comprises a probe sequence assigned to mobile station 913 as part of a network signaling protocol. In the preferred embodiment of the present invention the code assigned to mobile station 913 is spread by an orthogonal OVSF code, which is distinct from those codes utilized by both Dedicated Physical Data channel 101 and Dedicated Physical Control Channel 102. Thus, uplink communication signal 919 received at base stations 901–903 comprises a multiplicity of frequency and time overlapping coded signals from each channel transmitted. Each of these signals is transmitted simultaneously at the same radio frequency (RF) and is distinguishable only by its specific OVSF codes. In other words, uplink signal 919 received at a base-station receiver is a composite signal of each transmitted channel and an individual channel distinguishable only after decoding.

To initiate a location request, a command is originated at a regional entity such as MSC 905, an operations center (not shown), or perhaps within a connected network such as Public Switched Telephone Network (PSTN) (not shown). The location request, which includes identification information on the mobile station that is to be located, enters MSC 905 and is passed to CBSC 904. CBSC 904 instructs all base stations within the cellular system, or a subset of those base stations identified previously by mobile station registration, to broadcast a power-up function via downlink communication signal 916 to the mobile station 913. Unlike prior-art methods of utilizing power-up functions, in the preferred embodiment of the present invention the Dedicated Physical Location Channel's amplitude is increased utilizing gain module 503 prior to combination 504 with the other channels 101, 102. Additionally, gain module 503 increases the amplitude to a level consistent with reliable time-delay estimation at base stations 901–903. Finally, after enough data has been collected, or a timer of finite duration initialized at commencement of probing expires, CBSC 904 instructs the serving base stations to send an acknowledgment (Ack) to mobile station 913, instructing it to cease transmission over the Dedicated Physical Location Channel. The propagation delay at each base station is then forwarded by each base station 101, along with its base station identification, to a designated entity, (e.g., CBSC 904), and the location of the mobile station 113 is calculated based on the measurement of the propagation delay using TDOA or a combination of TDOA and TOA.

Figure 10:
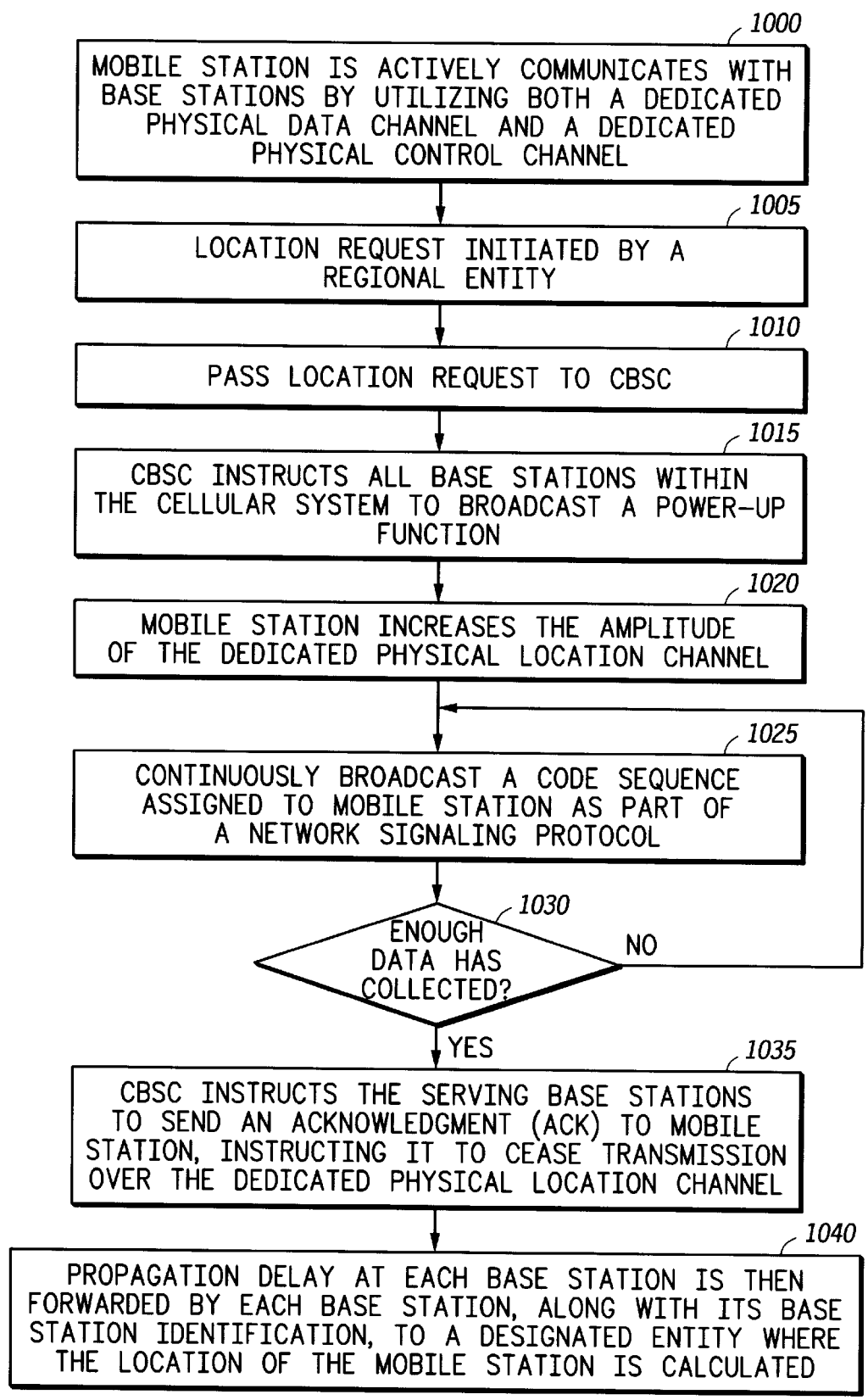
FIG. 10 is a flow chart showing operation of the communication system of FIG. 9 in accordance with the preferred embodiment of the present invention.

FIG. 10 is a flow chart showing operation of communication system 900 in accordance with the preferred embodiment of the present invention. The logic flow begins at step 1001 where mobile station 913 actively communicates with base stations 901–903 by utilizing both the Dedicated Physical Data Channel 101 and the Dedicated Physical Control Channel 102. Next, at step 1005 a location request is initiated by a regional entity such as MSC 905. At step 1010, the location request is passed to CBSC 904, and at step 1015, CBSC 904 instructs all base stations—or a subset of base stations identified during prior mobile station registration—within the cellular system to broadcast a power-up function command or message via downlink communication signal 916. In response, mobile station 913 increases the amplitude of the Dedicated Physical Location Channel consistent with reliable time-delay estimation at base stations 901–903 (step 1020), and continuously broadcasts a probe sequence assigned to mobile station 913 as part of a network signaling protocol (step 1025). At step 1030 CBSC 904 determines if enough data has been collected for an adequate location estimation to be made, and if not, the logic flow returns to step 1025. If at step 1030 it has been determined that enough data has been collected for an estimate of mobile station's 913 location, or a timer of finite duration initialized at commencement of probing expires, then the logic flow continues to step 1035 where CBSC 904 instructs the serving base stations to send an acknowledgment (Ack) to mobile station 913, instructing it to cease transmission over the Dedicated Physical Location Channel. Finally, at step 1040 the propagation delay at each base station is then forwarded by each base station 101, along with its base station identification, to a designated entity, (e.g., CBSC 904), and the location of the mobile station is calculated.

Figure 11:
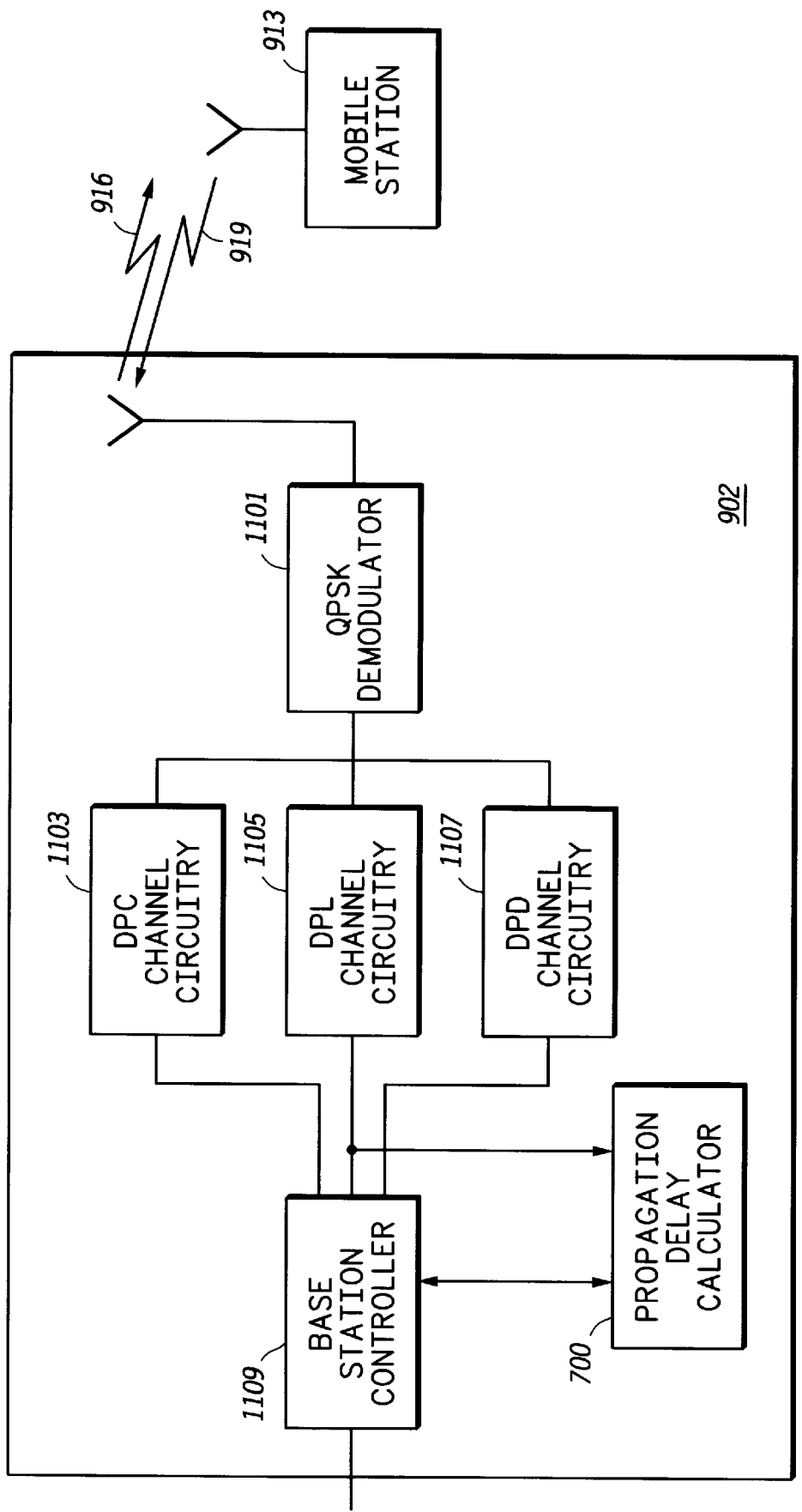
FIG. 11 is a block diagram of a base station of FIG. 9 in accordance with the preferred embodiment of the present invention.

FIG. 11 is a block diagram of a base station of FIG. 9 in accordance with the preferred embodiment of the present invention. As shown, the base station comprises QPSK demodulator 1101, DPCCH circuitry 1103, DPLCH channel circuitry 1105, DPDCH circuitry 1107, base station controller 1109, and propagation delay calculator 700. Operation of base station in accordance with the preferred embodiment of the present invention occurs as follows. Base station 902 utilizes channel circuitry 1103, 1105, and 1107 in conjunction with QPSK demodulator 1101 to despread and demodulate DPCCH, DPLCH, and DPDCH transmissions from mobile station 913. Additionally, when a location request is given to base station 902, base station controller 1109 sends mobile station 913 a PUF command via transmitting circuitry (not shown), and begins receiving, via DPLCH circuitry 1105, mobile station location information transmitted by mobile station 913. Mobile station location information is passed on to propagation delay calculator 700, where propagation delay information is calculated. This information is then passed on to base station controller 1109 and forwarded, along with its base station identification, to a designated entity, (e.g., CBSC 904), where the location of the mobile station is calculated.

While the invention has been particularly shown and described with reference to a particular embodiment, it will be understood by those skilled in the art that various changes in form and details may be made therein without departing from the spirit and scope of the invention.

What is claimed is:

1. A method for mobile station location within a communication system, the method comprising the steps of:

communicating with a plurality of base stations via a first frequency band using a first spreading code, the first spreading code defining a first channel utilized for transmitting data from the mobile station to the plurality of base stations;

communicating with the plurality of base stations via the first frequency band using a second spreading code, the second spreading code defining a second channel utilized for transmitting control information from the mobile station to the plurality of base stations; and communicating with the plurality of base stations via the first frequency band using a third spreading code, the third spreading code defining a third channel utilized for transmitting information to the plurality of base stations that is utilized for mobile station location within the communication system.

2. The method of claim 1 wherein the steps of spreading using the first spreading code, the second spreading code, and the third spreading code comprise the steps of spreading using a first orthogonal channelization code, a second orthogonal channelization code, and a third orthogonal channelization code.

3. The method of claim 1 further comprising the step of receiving the communication from the mobile station via the third channel and locating the mobile station based on the communication.

4. The method of claim 3 wherein the step of locating the mobile station comprises the step of locating the mobile station via a Time Difference of Arrival (TDOA) or a Time of Arrival (TOA) technique.

5. The method of claim 1 wherein the mobile station broadcasts a probe sequence corresponding via the DPLCH channel.

6. The method of claim 5 wherein the probe sequence is modulated by a complex sequence.

7. A method for mobile station location within a communication system, the method comprising the steps of:

communicating with a plurality of base stations via a first frequency band using a first spreading code, the first spreading code defining a first channel utilized for transmitting data from the mobile station to the plurality of base stations;

communicating with the plurality of base stations via the first frequency band using a second spreading code, the second spreading code defining a second channel utilized for transmitting control information from the mobile station to the plurality of base stations;

communicating with the plurality of base stations via the first frequency band using a third spreading code, the third spreading code defining a third channel utilized for transmitting information to the plurality of base stations that is utilized for mobile station location within the communication system;

receiving a power-up function command; and adjusting the power of only the third channel in response to the received power-up function command.

8. The method of claim 7 wherein the steps of spreading using the first spreading code, the second spreading code, and the third spreading code comprise the steps of spreading using a first orthogonal channelization code, a second orthogonal channelization code, and a third orthogonal channelization code.

9. The method of claim 7 further comprising the step of receiving the communication from the mobile station via the third channel and locating the mobile station based on the communication.

10. The method of claim 7 wherein the step of locating the mobile station comprises the step of locating the mobile station via a Time Difference of Arrival (TDOA) or a Time of Arrival (TOA) technique.

11. The method of claim 7 further comprising the step of combining the first channel, the second channel, and the third channel to form a plurality of frequency and time overlapping coded signals from each channel transmitted.

12. The method of claim 11 wherein the step of adjusting the power of only the third channel comprises the step of adjusting the third channel's amplitude prior to the step of combining the first, second, and third channel.

13. A method for mobile station location within a communication system, the method comprising the steps of:

receiving, via a first frequency band, a first spreading code, the first spreading code defining a first channel utilized for transmitting data from the mobile station to a base station;

receiving, via the first frequency band, a second spreading code, the second spreading code defining a second channel utilized for transmitting control information from the mobile station to the base station;

receiving, via the first frequency band, a third spreading code, the third spreading code defining a third channel utilized for transmitting information to the base station that is utilized for mobile station location within the communication system;

transmitting a power-up function command; and receiving via the first frequency band, the third spreading code at an increased power while continuing to receive the first and the second spreading codes at substantially the same power level.

14. The method of claim 13 wherein the steps of receiving the first spreading code, the second spreading code, and the third spreading code comprise the steps of receiving a first orthogonal channelization code, a second orthogonal channelization code, and a third orthogonal channelization code.

15. The method of claim 13 further comprising the step of receiving the communication from the mobile station via the third channel and locating the mobile station based on the communication.

16. The method of claim 15 wherein the step of locating the mobile station comprises the step of locating the mobile station via a Time Difference of Arrival (TDOA) or a Time of Arrival (TOA) technique.

17. An apparatus used for mobile station location within a communication system, the apparatus comprising:

first channel circuitry for communicating with a plurality of base stations via a first frequency band using a first spreading code, the first spreading code defining a first channel utilized for transmitting data from the mobile station to the plurality of base stations;

second channel circuitry for communicating with the plurality of base stations via the first frequency band using a second spreading code, the second spreading code defining a second channel utilized for transmitting control information from the mobile station to the plurality of base stations; and third channel circuitry for communicating with the plurality of base stations via the first frequency band using a third spreading code, the third spreading code defining a third channel utilized for transmitting information to the plurality of base stations that is utilized for mobile station location within the communication system.

* * * * *